United States Patent Office 3,433,052
Patented Mar. 18, 1969

3,433,052
MATERIAL TESTER
Dale R. Maley, Boulder, Colo., assignor to Automation Industries, Inc., Los Angeles, Calif., a corporation of California
Filed July 26, 1965, Ser. No. 474,811
U.S. Cl. 73—15
Int. Cl. G01n 23/20
9 Claims

ABSTRACT OF THE DISCLOSURE

The nondestructive tester disclosed herein is effective to transfer heat or thermal energy into a workpiece and to measure the variations in temperature of the incremental areas on the surface of the workpiece to determine the internal characteristics of the workpiece. Means are also provided for continuously compensating for variations in the emissivity of the surface and eliminating variations produced by the changes in emissivity. This provides an output signal that is a function of the internal characteristics of the workpiece and independent of changes in surface emissivity.

---

Figure 1:
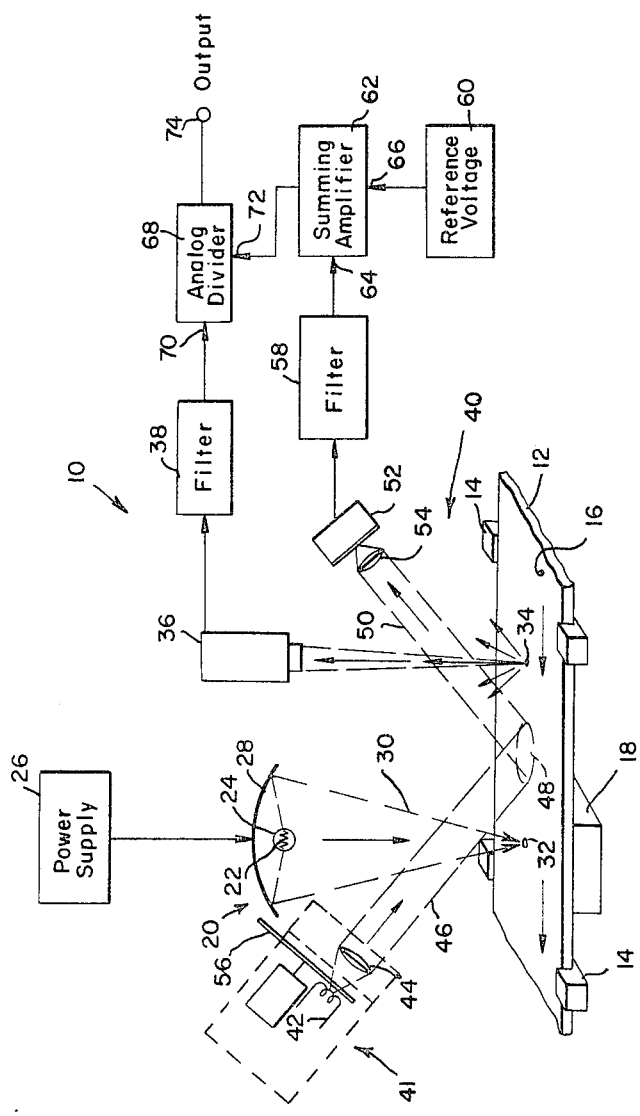

The present invention relates to testers for inspecting workpieces and, more particularly, to nondestructive testers capable of inspecting workpieces for hidden defects by means of infrared energy.

A wide variety of different types of systems are presently available for observing and measuring various characteristics of a workpiece such as internal dimensions, hidden defects, etc. These systems employ some physical phenomenon or effect such as the manner in which the workpiece responds to some form of energy. Although nearly every form of energy has been employed, ultrasonic, magnetic, eddy currents, etc., are most widely employed for commercial purposes. However, in recent years numerous efforts have been directed toward employing infrared energy and heat. In this form of tester, heat is transferred into or out of the workpiece and the manner in which the workpiece responds is observed.

The rate at which heat flows through a workpiece is a function of its thermal conductivity. Thermal conductivity is primarily a function of the type of material, but it is also very closely related to other characteristics such as porosity, voids, inclusions, grain structures, etc. As a result, if there are local variations in these characteristics, there will be corresponding local variations in the thermal conductivity of the workpiece. When the temperature of the workpiece changes, the temperature of each incremental area of the surface is a function of the thermal conductivity immediately adjacent thereto. Accordingly, by observing the temperatures of the incremental areas, it is possible to determine the various characteristics of the workpiece, and particularly any variations such as would result from the presence of an internal defect, i.e., a void, an inclusion, a variation in the thickness, etc.

One convenient means of accurately measuring the surface temperature and particularly in small incremental areas, is to employ a device such as a radiometer. The radiometer is focused on the surface of the workpiece and receives the infrared energy radiated therefrom. The intensity and/or the wave length of the radiated infrared energy is primarily a function of the temperature of the surface, but it is also a function of the emissivity. Accordingly, if there are material variations in the emissivity there will be corresponding variations in the amount of radiation. Since the radiation varies as the fourth power of the temperature in those systems employing relatively small temperature changes, i.e., less than 50 degrees, normal variations in the emissivity become very large compared to the variations resulting from changes in temperature of the surface. This problem becomes extremely acute when the entire surface of a workpiece is being scanned as frequently the emissivity varies in different portions of the surface. Heretofore, when testing a workpiece by means of infrared radiation it has been necessary to eliminate variations in emissivity by making the emissivity equal to a standard level. This has normally been accomplished by painting the entire surface a uniform black. Such a step is not only time consuming and costly, but also frequently destroys or greatly reduces the value of the workpiece. As a result, infrared test systems employed heretofore have had numerous disadvantages and limitations which have greatly reduced their commercial value.

The present invention overcomes the foregoing disadvantages and limitations. More particularly, the present invention provides an infrared test system which is capable of scanning the surface of a workpiece and providing a signal which is solely a function of the temperature even though there may be wide variations in the emissivity of the surface being scanned. This is accomplished by measuring the reflectivity and then changing the reflectivity signal into an emissivity signal. The emissivity signal is then employed to convert the radiation signal into a temperature signal.

In the limited number of embodiments of the present invention disclosed herein, the workpiece is heated by projecting electromagnetic energy onto its surface whereby the temperatures of the various incremental surface areas are a function of the internal characteristics of the workpiece immediately adjacent thereto. A radiometer scans the successive incremental areas and produces a radiation signal that is, in part, a function of the temperature of the area. At the same time, a relatively small amount of energy is projected onto the workpiece so as to be reflected from the region being scanned by the radiometer. A detector is positioned to receive the reflected energy and produce a signal which is a function of the reflectivity. Since the sum of the reflectivity and emissivity is always a constant (i.e., unity) an emissivity signal can be obtained by subtracting the reflectivity signal from a constant reference. The resultant emissivity signal is divided into the radiation signal to produce a signal which is purely a function of the surface temperature. Thus, this signal will be independent of any variation in the emissivity and can be used as a reliable indication of the quality of the workpiece and the presence or absence of any defects.

Figure 2:
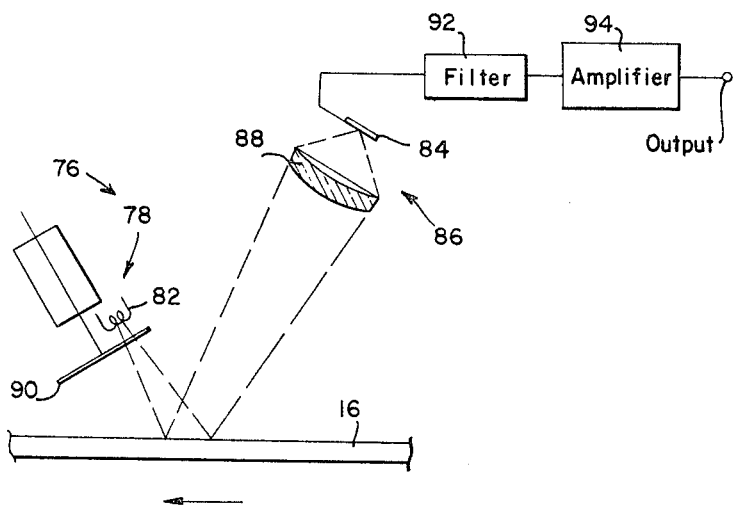

These and other features and advantages of the present invention will become readily apparent from the following detailed description of a limited number of embodiments thereof, particularly when taken in combination with the accompanying drawings wherein like reference numerals refer to like parts and wherein:

FIGURE 1 is a block diagram of an infrared test system embodying one form of the present invention, and FIGURE 2 is a block diagram of a modified form of the present invention.

Referring to the drawings in more detail, the present invention is particularly adapted to be embodied in a test system 10 for inspecting a workpiece 12 for hidden defects, and/or measuring its dimensions. Although the workpiece 12 may be of any desired variety, for purposes of illustration, it is shown as a relative flat member such as a piece of sheet metal or panel.

A support 14 is provided to retain the workpiece 12 in position while it is being tested or inspected by the system 10. To facilitate rapidly testing or inspecting the entire surface 16 of the workpiece 12 the support 14 includes a scan mechanism 18 for moving the workpiece 12. This scan mechanism 18 is capable of moving the workpiece 12 in a single direction at a first rate of speed whereby the surface 16 of the workpiece 12 is scanned along a single line. In addition, the scan mechanism 18 is capable of moving the workpiece 12 in a second direction at a second rate of speed. This will permit the entire surface 16 of the workpiece 12 being systematically scanned in a series of generally parallel lines.

The test system 10 includes means for varying the temperature of the workpiece by transferring heat into or out of the entire workpiece 12 or only a limited portion thereof. In the present instance, this is accomplished by means of a heater 20 such as the filament 22 of a lamp 24. The lamp 24 is connected to a power supply 26 that continuously circulates a substantially uniform electrical current through the filament 22.

A suitable focusing means such as a lens and/or mirror 28 may be provided for concentrating substantially all of the radiant energy from the lamp into a well defined beam 30. The beam 30 is focused into a relatively small area whereby a hot spot 32 is formed on the surface 16 of the workpiece 12. The amount of power supplied to the spot 32 and the size of the spot 32 will depend upon the nature of the material, the type of test being performed, the rate of scan, etc. However, normally the hot spot 32 will be of such a nature as to cause a temperature rise on the surface 16 in the general range of about 25° to 50° above the ambient temperature.

As the radiant energy in the beam 30 is incident upon the workpiece 12, it will cause heat to be produced in the region immediately adjacent to the surface 16. A portion of this heat will be conducted into the interior of the workpiece 12 whereby it will flow transversely toward the back surface and laterally parallel to the back surface. Another portion of this heat will be reradiated from the surface 16 in the form of infrared energy.

The amount of heat that is conducted into the interior of the workpiece 12 is a function of a large number of factors such as the thermal conductivity of the material, the amount of temperature differential, etc.

If the workpiece 12 is relatively thick, the heat will tend to flow or disperse throughout the entire interior of the workpiece 12 whereby the workpiece 12 will in effect function as a heat sink. As a consequence, little energy will remain near the surface 16 and the temperature on the surface will not rise appreciably. In contrast, if the workpiece 12 is relatively thin, there will not be as large a volume of material available to absorb the energy. The energy will relatively rapidly reach the back surface whereby the ability of the workpiece 12 to absorb energy will be limited primarily by the rate at which the energy can flow laterally through the workpiece 12 in directions parallel to the back surface. It can thus be appreciated that for a given amount of energy, the temperature on the surface 16 of a thin workpiece will change more than on a thick workpiece.

If the interior of the workpiece 12 is homogeneous, the rate and amount of energy transferred will be uniform as the hot spot 32 scans across the surface 16. However, it should be noted that irrespective of whether the workpiece 12 is thick or thin, if there are any internal localized discontinuities in the workpiece, such as an air pocket or void, some form of inclusion, a change in thickness, a variation in the bonding between two layers, etc., there will be a corresponding localized variation in the thermal conductivity of the workpiece. As a consequence, as the hot spot 32 scans across the workpiece 12 there will be localized variations in the temperature on the surface 16 which correspond to the variations inside of the workpiece.

It may thus be seen that by observing the localized temperatures of the incremental areas 34, the thermal conductivity and, therefore, the characteristics of the workpiece 12 including its thickness, internal integrity, etc., can be determined.

The temperatures of the incremental area 34 may be measured by any suitable form of pickup means. However, in the present instance, a so-called radiometer 36 is employed to receive infrared energy radiated from the surface 16. The radiometer 36 produces a corresponding electrical signal.

The radiometer 36 is focused on an incremental area 34 in the surface 16 of the workpiece 12 so as to receive only the infrared energy radiated from that area. The magnitude or amplitude of these radiations varies as the fourth power of the temperature whereby the radiation signal from the radiometer 36 will correspond to the fourth power function of the temperature.

The radiometer 36 is positioned so that the incremental area 34 upon which it is focused is displaced from the hot spot 32 formed by the heater 20. The amount and direction of displacement are selected such that the incremental area 34 being scanned by the radiometer 36 was scanned by the heater 20 a predetermined time interval therebefore.

As a consequence, the incremental area 34 will first be heated at a predetermined rate to form a hot spot 32 having a predetermined amount of energy therein. Following this, the energy in the hot spot 32 will tend to disperse in the manner described above, i.e., a portion of the energy will flow through the workpiece 12 and a portion will be radiated from the surface 16.

The rate at which the energy is conducted through the workpiece 12 and, therefore, the rate at which the surface temperature at the hot spot 32 falls will be a function of the internal characteristics. Accordingly, by measuring the amount of radiation from an incremental area 34 a predetermined time after it was heated, the radiometer 36 will provide a radiation signal that is a function of the internal structure of the workpiece 12 adjacent that area.

It can be appreciated that the radiations from the surface 16 will be substantially uniform or will vary relatively slowly, particularly when the workpiece 12 is homogeneous. As a consequence, the radiation signal produced by the radiometer 36 would be of a correspondingly slowly varying or DC variety. To eliminate the disadvantages of a DC signal and to improve the response of the radiometer 36, it has been found desirable to employ a device such as a shutter wheel (not shown) in front of the radiometer 36. This will "chop" the radiation whereby the radiations reaching the radiometer 36 will be of the AC variety. The radiometer will thereby produce an alternating signal whose amplitude is modulated in accordance with the magnitude of the radiations received by the radiometer.

The frequency of the radiation signal is constant as determined by the speed of the shutter wheel. A filter 38 is coupled to the output of the radiometer 36 and is tuned to pass only signals of the frequency of the radiation signal and to suppress all other signals.

The AC radiation signal from the filter 38 varies as the fourth power of the temperature. However, it also varies as a function of the emissivity of the incremental area 34 being scanned. That is, if the surface is black or nearly black (i.e., in the infrared region) the emissivity will be high and the intensity of the radiations will also be high. However, if the surface 16 is gray the emissivity will be lower and the intensity of the radiations will be lower even though the temperature remains the same.

In a system wherein the hot spot 32 has a temperature rise on the order of 50° above ambient, the variations in the temperatures at the incremental area 34 being scanned by the radiometer 36 (i.e., the difference between temperatures corresponding to acceptable and non-acceptable) will be relatively small and must be accurately measured. However, the normal variations in emissivity may be effective to produce variations in the magnitude of the radiation that completely obscures variations produced by the temperature changes.

In prior infrared systems the effects of variations in emissivity have been eliminated by making the emissivity uniform, i.e., painting the surface 16 black. In the present system the effects of emissivity are eliminated by an emissivity corrector 40 whereby a true reading as to the surface temperature is produced.

Although this emissivity corrector 40 may be of any suitable nature, in the present instance, it includes a projector 41 for projecting energy onto the surface 16 of the workpiece 12 and receiving the energy reflected therefrom. More particularly, a lamp 42 is provided for producing light which is within the visible spectrum. Means such as a reflector or lens 44 may be provided to collimate the light into a beam 46 of substantially parallel rays.

The light beam 46 is directed onto the surface of the workpiece 12 and forms a bright spot 48. Although the position of the bright spot 48 may vary over a wide range, ti is preferably positioned close to the incremental area 34 being scanned by the radiometer 36. In the present instance, it is disposed approximately halfway between the hot spot 32 and incremental area 34. The light in the beam 46 will be reflected from the bright spot 48 as a second beam 50 substantially symmetrical to the first beam. The intensity of the light in the reflected beam 50 is a function of the reflectivity of the surface 16 at the bright spot 48.

A detector 52 may be disposed opposite the projector 41 so as to receive the beam of reflected light. This detector 52 may be of any suitable variety such as a photoelectric cell capable of producing an electric signal that is a function of the light intensity. In order to improve the response, light collecting means such as a lens 54 may be disposed in front of the detector 52 to concentrate the light on the detector.

The detector 52 produces an electrical signal that is a function of the light intensity and thereof also of the reflectivity of the surface 16. As can be appreciated, the reflectivity will frequently be virtually uniform or at best vary relatively slowly. The system 10 may be simplified by employing AC signals. This eliminates the necessity of employing direct coupling. This is accomplished by providing a device such as a chopping wheel or shutter wheel 56 to modulate the light incident upon the surface 16 of the workpiece 12.

The chopping of the light also has several other advantages. There is normally a large amount of ambient visible light, but by coding or modulating the light it is possible to eliminate the effects of and interefrence from surrounding light sources whereby a drastic improvement in the signal-to-noise ratio is obtained. It also has been found that the AC characteristics of the more economical photoelectric detectors 52 are generally far superior to the DC characteristics. Accordingly, the use of a chopper wheel 56 will also improve the sensitivity of the system.

The output of the detector 52 is coupled to a filter 58 tuned to the frequency of the chopper wheel 56. Thus, the signal from the filter 58 will be an AC signal having an amplitude that is a function of the reflectivity of the surface 16 in the region of the incremental area 34 being scanned by the radiometer 36.

The sum of the reflectivity and emissivity of a surface is constant, i.e., equal to unity. Accordingly, to convert the reflectivity signal from the filter 58 into an emissivity signal, the reflectivity signal may be subtracted from a suitable reference signal. The reference signal normally has a constant amplitude and is obtained from a constant voltage source 60.

A summing amplifier 62 having two separate inputs 64 and 66 is provided. One input 66 is coupled to the reference source 60 while the other input 64 is coupled to the filter 58. This amplifier 62 is effective to obtain a difference or emissivity signal by subtracting the reflectivity signal from the constant reference signal. The resultant difference signal will, of course, be a function of the emissivity of the surface 16 at the bright spot 48.

As previously stated, the radiation signal from the filter 38 is a function of the product of emissivity and the fourth power of the temperature, i.e. $f(\epsilon t^4)$ and the signal from the summing amplifier 62 is a function of the emissivity, i.e., $f(\epsilon)$. Therefore, in order to eliminate the effects of emissivity, the signal from the filter 38 may be divided by the signal from the amplifier 62. This will cancel the emissivity from the radiation signal and leave a signal that is only a function of the fourth power of temperature.

In the present instance, this division is accomplished by means of a divider 68 having two separate inputs 70 and 72. The first input 70 is coupled to the output of the filter 38 so as to receive the radiation signal while the second input 72 is coupled to the output of the amplifier 62 to receive the emissivity signal. The divider 68 may be of the analog variety and effective to produce an analog quotient. As a result, the output from the divider 68 will be a signal which is a true fourth power of the temperature and independent of emissivity.

The output 74 of the divider 68 may be coupled to any suitable utilizing means. For example, indicating means may be provided to indicate the temperature of the surface 16 of the workpiece 12. The indicating means may include a suitable recording mechanism, an oscilloscope, a meter, an alarm, etc. whereby any deviations in the temperature beyond normal limits will be effective to indicate that there is a defect in the workpiece 12.

In order to employ the present system 10 for testing or inspecting a workpiece 12, the workpiece 12 may be placed on the support 14. The scan mechanism 18 and heater 20 may then be energized. As the workpiece 12 is carried past the heater 20 a hot spot 32 will be produced that travels across the surface 16 of the workpiece 12. The radiometer 36 will then scan a sequence of incremental areas 34 that were heated by the heater 20 a predetermined interval therebefore. The temperature of the incremental area 34 will be a function of the thermal conductivity of the workpiece 12 adjacent thereto. This, in turn, is a function of the presence or absence of discontinuities such as voids, inclusions, delaminations, variations in thickness, etc.

As the radiometer 36 scans the successive incremental areas 34 it will produce a signal that is a function of the temperature and also of the emissivity. However, at the same time the projector 41 will produce a beam of light 46 that is reflected from the surface 16 immediately adjacent the incremental area 34. The detector 52 will thereby produce a reflectivity signal which is converted into an emissivity signal at the summing amplifier. The divider 68 will then divide the radiation signal by the emissivity signal to produce a pure temperature signal. This temperature signal may be coupled to suitable output means for indicating the presence or absence of any discontinuities.

The use of visible light in the emissivity corrector 40 has numerous advantages such as readily available incandescent lights, photoelectric cells, etc. which are inexpensive and reliable. However, it has been found that under some circumstances the reflectivity of the surface 16 in the frequency band of visible light does not always correlate with the reflectivity in the infrared region wherein the radiometer 36 is effective. Under these conditions, the effects of variations in emissivity are not entirely eliminated. In order to overcome these and other difficulties, the emissivity corrector may correspond to the embodiment illustrated in FIGURE 2.

In this embodiment 76, the projector 78 is provided for projecting energy onto the surface 16 of the workpiece 12. The major portion of the energy produced by this projector 78 is preferably in a band of frequencies wherein the reflectivity correlates very closely with the reflectivity in the frequency of the radiations from the incremental area 34. Although any type of source may be employed in the projector 78, in the present instance a heat source 80 having an electrically energized filament 82 is employed.

An infrared detector 84 is symmetrically disposed with respect to the projector 78. The detector 84 is sensitive to radiation in the desired frequency band, and is effective to produce an electrical signal proportional thereto.

Focusing means 86 may be provided for concentrating the energy on the detector 84. Although this means may be similar to the preceding embodiment, it differs therefrom in that a collimated beam is not employed. Instead, one or more collecting lens 88 may be disposed in front of the detector. This lens 88 is transparent to the infrared energy to be detected and concentrates the reflected energy onto the detector 84. This lens is preferably focused on the infrared source 82. As a result, the energy which is detected by the detector 84 will be received or reflected from a relatively narrow spot on the surface 16. However, stray energy from spurious sources will not be focused onto the detector 84. This will assist in reducing the effects of ambient radiation. It has also been found desirable to provide a shutter or chopping wheel 90 to modulate the reflected energy and filter the signal from the detector 84. This will provide an AC reflectivity signal corresponding to the preceding reflectivity signal. This signal may be employed to provide an emissivity signal as in the preceding embodiment.

In order to employ this embodiment, the workpiece 16 may be mounted on a suitable support 14 whereby it will be carried by the scan mechanism 18. A suitable heat source 20 and radiometer 36 may be employed for heating and scanning the surface of the workpiece so as to produce a radiation signal which is a function of the emissivity and the fourth power of the temperature. At the same time, the radiation corrector 76 will project infrared energy onto the surface of the workpiece for reflection onto the detector 84. The detector 84 will then produce an emissivity signal similar to the emissivity signal produced by the detector 52. A filter 92 is tuned to a frequency corresponding to that of the shutter wheel 90 so as to produce a filtered AC emissivity signal. This signal will then be amplified in the amplifier 94 and coupled into a divider similar to the divider 68 in the first embodiment. As a result, a signal will then be provided which is purely a function of the fourth power of the temperature.

While only a limited number of embodiments of the present invention are disclosed herein, it will be readily apparent to persons skilled in the art that numerous changes and modifications may be made thereto without departing from the scope of the invention. Accordingly, the foregoing disclosure and description thereof are for illustrative purposes only and do not in any way limit the invention which is defined only by the claims which follow.

I claim:

1. A tester for testing a workpiece and indicating the characteristics thereof, said tester including the combination of:

means effective to produce a change of temperature in the workpiece whereby the instantaneous infrared radiations from each incremental area of the surface is a function of an internal characteristic of the workpiece adjacent thereto, first pickup means responsive to infrared radiations within a predetermined band width, said pickup means being effective to receive such radiations from an incremental area on the surface of the workpiece and provide a radiation signal that is a function thereof, projection means effective to project energy within a second band width onto the surface of the workpiece in a small region immediately adjacent to the incremental area being viewed by the pickup means, second pickup means positioned to receive the projected energy reflected from said surface, said second pickup means being effective to provide a reflectivity signal that is a function of the reflectivity of said region on the surface of the workpiece, scan means coupled to the first and second pickup means and to the projection means for simultaneously scanning them over the surface of the workpiece, reference means for producing a reference signal corresponding to a predetermined surface reflectivity, means for subtracting the reflectivity signal from the reference signal to provide an emissivity signal, dividing means for dividing the radiation signal by the emissivity signal to provide an output signal, and output means coupled to the dividing means providing said output signal indicating the thermal conductivity characteristics of the workpiece.

2. The tester of claim 1 including:

means for modulating the projected energy whereby the reflected energy is distinct from the radiations from the incremental areas and the reflection signal is modulated, and demodulation means for removing the modulations from the reflection signal.

3. The tester of claim 2 wherein:

the modulating means includes a shutter wheel disposed in the path of the projected energy for modulating the intensity thereof, and the demodulating means includes a filter.

4. A nondestructive infrared tester for testing a workpiece and indicating the characteristics thereof, said tester including the combination of:

means effective to produce a change of temperature in the workpiece whereby the instantaneous temperature of each incremental area of the surface of the workpiece is a function of an internal characteristic of the workpiece adjacent thereto, first pickup means effective to receive the infrared radiations from an incremental area and produce a radiation signal that is a function of the infrared radiation from the incremental area, means including a second pickup means effective to provide a second signal that is a function of the emissivity of said surface, scan means for simultaneously scanning said first and second pickup means over the surface of the workpiece whereby the radiation signal varies as a function of the radiations from the incremental areas and the second signal varies as a function of the surface emissivity adjacent to the incremental areas, signal dividing means coupled to the first and second pickup means and responsive to said radiation and emissivity signals, said signal dividing means being effective to divide one of said signals by the other to provide an output signal which is substantially independent of variations in the emissivity of said surface, and output means coupled to said signal dividing means providing a signal indicating the thermal conductivity characteristics of the workpiece.

5. A tester for testing a workpiece wherein the infrared radiations from the workpiece correspond to the characteristics of the workpiece, said tester including the combination of:

a radiometer responsive to infrared radiations from the surface of the workpiece, said radiometer being effective to produce a radiation signal that is a function of the radiations, a projector for directing substantially visible light onto the surface of said workpiece, pickup means for receiving the light reflected from said surface to provide a reflectivity signal proportional to the reflectivity of said surface, a reference source for providing a reference signal, difference means coupled to the pickup means and the reference source, said difference means effective to sense the difference between the reference signal and the reflectivity signal to provide an emissivity signal that is a function of the emissivity of the surface of said workpiece, and means coupled to the radiometer and the difference means and responsive to the radiation and emissivity signals, said means providing an output signal indicating the thermal conductivity characteristics of the workpiece.

6. A tester for testing a workpiece wherein the infrared radiations from the surface of the workpiece correspond to the characteristics of the workpiece, said tester including the combination of:

radiometer means responsive to radiation from an incremental area on the surface of the workpiece, said radiometer means being effective to produce a radiation signal that is a function of the radiations from the incremental areas, projection means for projecting visible light onto the surface of the workpiece adjacent to incremental areas, means effective to receive the light reflected from said surface and effective to provide a reflectivity signal that is a function of the reflectivity of the surface adjacent the incremental area, signal conversion means coupled to the receiving means and effective to convert the reflectivity signal into an emissivity signal, scan means for simultaneously scanning the radiometer and said projection means across the surface of the workpiece whereby the radiation signal and emissivity signal are functions of the radiations and emissivity over the surface of the workpiece, means coupled to the radiomenter means and to the signal conversion means for dividing the radiation signal by the emissivity signal to provide an output signal that is independent of the emissivity of the surface.

7. A tester for testing a workpiece and indicating the characteristics of the workpiece, said tester including the combination of:

radiometer means responsive to infrared radiations from incremental areas on the workpiece, said radiometer means being effective to produce a radiation signal that is a function of the intensity of said radiations, projecting means for projecting a collimated beam of visible light onto a surface of said workpiece adjacent to said incremental area for reflection therefrom, receiving means effective to receive the light reflected from said surface and provide an electrical signal that is a function of the reflections, a shutter wheel in said beam of light to modulate the intensity of light in said beam whereby the electrical signal from the receiving means is modulated, demodulation means coupled to the receiving means and effective to demodulate said electrical signal and produce a signal that is a function of the reflectivity of the surface of said workpiece, and output means coupled to the radiometer means and the demodulator responsive to the radiation and reflectivity signals, said output means providing a signal indicating the thermal conductivity characteristics of the workpiece.

8. A tester for testing a workpiece and indicating the characteristics of the workpiece, said tester including the combination of:

a radiometer responsive to infrared radiation from an incremental area on the surface of the workpiece, said radiometer being effective to produce a radiation signal that is a function of the radiations from the incremental area, an energy source for projecting a beam of energy onto said workpiece adjacent the incremental area for reflection therefrom, means effective to modulate the energy in said beam distinct from the radiations, a detector disposed in the path of the reflected energy, said detector being focused on said source and effective to provide a modulated signal that is a function of the reflected modulated energy, a demodulator coupled to the detector and responsive to the modulated signal, said demodulator being effective to demodulate the signal and provide a signal that is a function of the reflectivity of said workpiece, and output means coupled to the radiometer and to the demodulator and responsive to the signals therefrom, said output means providing a signal indicating the thermal conductivity characteristics of the workpiece.

9. A tester for testing a workpiece and indicating the characteristics of the workpiece, said tester including the combination of:

a radiometer responsive to infrared radiations from an incremental area on the surface of the workpiece, said radiometer being effective to produce a radiation signal that is a function of the radiation from said incremental area, an energy source for projecting energy onto a portion of the surface of the workpiece adjacent to the incremental area for reflection therefrom, a detector positioned to receive the energy reflected from the surface of the workpiece, said detector being focused on said portion of the surface and effective to provide a signal that is a function of the reflectivity of said workpiece, emissivity correction means coupled to the detector and responsive to the reflectivity signal, said correction means being effective to provide an emissivity signal, said emissivity correction means being coupled to the radiometer and effective to divide the radiation signal by the emissivity signal to produce an output signal that is independent of variations in emissivity, output means coupled to the radiometer and to the emissivity correction means and responsive to the output signal therefrom to indicate the thermal conductivity characteristics of the workpiece.

References Cited

UNITED STATES PATENTS

| | | | |
|---|---|---|---|
| 3,020,745 | 2/1962 | Sielicki | 73—15 |
| 3,206,603 | 9/1965 | Mauro | 250—83.3 |
| 3,261,257 | 7/1966 | Pfister | 88—22.5 |
| 2,658,390 | 11/1953 | Machler | 73—355 |

OTHER REFERENCES

Bernard, Burton: Determining Emissivity; May 1964, Instruments & Control Systems; pp. 87–89.

JAMES J. GILL, *Primary Examiner.*

E. D. GILHOOLY, *Assistant Examiner.*

U.S. Cl. X.R.

73—355; 250—83.3; 336—20